US008542833B2

(12) United States Patent
Devol et al.

(10) Patent No.: US 8,542,833 B2
(45) Date of Patent: Sep. 24, 2013

(54) SYSTEMS AND METHODS TO SECURE LAPTOPS OR PORTABLE COMPUTING DEVICES

(75) Inventors: Randall Devol, Mountain View, CA (US); Jonghoon John Kang, Saratoga, CA (US); Bao Tran, Saratoga, CA (US)

(73) Assignee: Bao Tran

( * ) Notice: Subject to any disclaimer, the term of this patent is extended or adjusted under 35 U.S.C. 154(b) by 128 days.

(21) Appl. No.: 12/950,152

(22) Filed: Nov. 19, 2010

(65) Prior Publication Data

US 2011/0305337 A1 Dec. 15, 2011

Related U.S. Application Data

(60) Provisional application No. 61/354,202, filed on Jun. 12, 2010.

(51) Int. Cl.
*G06F 21/00* (2013.01)
*H04L 9/32* (2006.01)

(52) U.S. Cl.
USPC ............. 380/259; 726/34; 726/33; 726/3; 726/16; 380/270

(58) Field of Classification Search
USPC ......................................................... 380/259
See application file for complete search history.

(56) References Cited

U.S. PATENT DOCUMENTS

| | | | | |
|---|---|---|---|---|
| 5,936,526 A * | 8/1999 | Klein | | 340/571 |
| 6,011,473 A * | 1/2000 | Klein | | 340/571 |
| 7,190,264 B2 * | 3/2007 | Brown et al. | | 340/539.23 |
| 7,230,933 B2 * | 6/2007 | Bahl et al. | | 370/311 |
| 7,502,619 B1 * | 3/2009 | Katz | | 455/456.5 |
| 7,567,176 B2 * | 7/2009 | Stephens | | 340/568.1 |
| 8,346,234 B2 * | 1/2013 | Banga et al. | | 455/418 |
| 2005/0138356 A1 * | 6/2005 | Hurwitz | | 713/155 |
| 2005/0253714 A1 * | 11/2005 | Stephens | | 340/568.1 |
| 2006/0072761 A1 * | 4/2006 | Johnson et al. | | 380/270 |
| 2006/0160559 A1 * | 7/2006 | Bahl et al. | | 455/522 |
| 2006/0199538 A1 * | 9/2006 | Eisenbach | | 455/41.2 |
| 2007/0277230 A1 * | 11/2007 | Hawkins et al. | | 726/4 |
| 2007/0297609 A1 * | 12/2007 | Adams et al. | | 380/270 |
| 2008/0014869 A1 * | 1/2008 | Demirbasa et al. | | 455/41.2 |
| 2008/0083982 A1 * | 4/2008 | Kelley et al. | | 257/722 |
| 2008/0141041 A1 * | 6/2008 | Molaro et al. | | 713/193 |
| 2008/0214111 A1 * | 9/2008 | Moshir et al. | | 455/41.2 |
| 2009/0075593 A1 * | 3/2009 | Demirbasa et al. | | 455/41.2 |
| 2010/0022217 A1 * | 1/2010 | Ketari | | 455/411 |
| 2010/0073188 A1 * | 3/2010 | Mickle et al. | | 340/825.49 |
| 2010/0115144 A1 * | 5/2010 | Dubs et al. | | 710/8 |
| 2010/0120406 A1 * | 5/2010 | Banga et al. | | 455/418 |
| 2010/0210240 A1 * | 8/2010 | Mahaffey et al. | | 455/411 |
| 2011/0055891 A1 * | 3/2011 | Rice | | 726/2 |
| 2011/0086615 A1 * | 4/2011 | Golder | | 455/411 |
| 2011/0086632 A1 * | 4/2011 | Tumey et al. | | 455/421 |
| 2011/0215921 A1 * | 9/2011 | Ben Ayed et al. | | 340/539.11 |
| 2013/0137376 A1 * | 5/2013 | Fitzgerald et al. | | 455/41.3 |

* cited by examiner

*Primary Examiner* — Andrew L Nalven
*Assistant Examiner* — Christopher Ruprecht
(74) *Attorney, Agent, or Firm* — Tran & Associates

(57) ABSTRACT

A security system includes an appliance to be secured, including a processor and a first wireless transceiver for accessing a data network with a first power requirement; and a second wireless transceiver receiving power to operate even if the appliance is off, hibernates or sleeps, the second wireless transceiver operating at a second power requirement lower than the first power requirement, the second wireless transceiver communicating a signal indicating a security status of the appliance.

20 Claims, 19 Drawing Sheets

Please enter parameters:

Radius of mobile phone distance before alarm      _____
Frequency of checking laptop for presence of phone _____
Alarm Volume      _____
Telephone number to call      _____
SMS number to text alarm      _____

Laptop login ID      _____
Laptop login Password      _____
    ❏ Buzzer
        ❏ High
        ❏ Medium
        ❏ Low
   ❏ Vibration
   ❏ SMS
        ❏ Number
          (800)888-8888
        ❏ Call?

SYSTEMS AND METHODS TO SECURE LAPTOPS OR PORTABLE COMPUTING DEVICES

The present application claims priority to provisional application Ser. No. 61/354,202, filed Jun. 12, 2010, the content of which is incorporated by reference.

BACKGROUND OF THE INVENTION

The present application relates to securing of laptop computers or portable devices.

Miniaturization and increases in reliability have enabled electronic devices that are portable and can be easily transported with users as they travel to different locations. This has empowered users with a great deal of flexibility in that the data being stored on the data storage device is available to the user even at a different location. A common example of this may be a laptop or portable computer, which may use a smaller hard disk drive with a smaller form factor to enhance portability. For example, a laptop computer can be used at work, and then transported to a different building at work or moved home for continued use at a different location.

However, as electronic devices become more portable, there is also an increasing probability that the electronic devices will become lost or stolen as users operate the electronic devices in different locations. The electronic device may be accidentally left behind, forgotten in transit, misplaced, or stolen by others. Not only does this present a problem in that the electronic device is no longer available to the user, but any data stored on the device may be easily obtainable by a third party. Any sensitive information such as business plans, financial information, or company data that was present on the data storage device within the electronic device may now be available to a third party. As can be expected, this poses a significant problem to the owner of the laptop and/or the company.

U.S. patent application Ser. No. 20080141041 discloses a wireless encryption key integrated storage system to prevent unauthorized access of data stored on the storage device without secure authentication between the storage device and a key device. In one embodiment, a data storage device comprises a magnetic disk; a head assembly having a read/write head which read and write data from/on the magnetic disk; a wireless transceiver configured to receive and transmit wireless signals from a key device, the wireless signals comprising information used to establish a secure authorization between the data storage device and the key device to access secured content in the magnetic disk; and a processor configured to encrypt/decrypt data transferred between the data storage device and the key device.

SUMMARY

In one aspect, a security system includes an appliance to be secured, including a processor and a first wireless transceiver for accessing a data network with a first power requirement; and a second wireless transceiver receiving power to operate even if the appliance is off, hibernates or sleeps, the second wireless transceiver operating at a second power requirement lower than the first power requirement, the second wireless transceiver communicating a signal indicating a security status of the appliance.

In another aspect, a method to secure an appliance includes powering a processor with a first power source; providing a wireless transceiver having a second power source independent of the first power source to allow the wireless transceiver to operate even if the appliance is off, sleeps or hibernates; and determining a security status of the appliance through the wireless transceiver.

In yet another aspect, a motherboard includes a processor; a first wireless transceiver for accessing a data network with a first power requirement, wherein the first wireless transceiver is disabled if the appliance is off, hibernates or sleeps; and a second wireless transceiver continuously operating at a second power requirement lower than the first power requirement, wherein the second wireless transceiver receives continuous power to operate even if the motherboard is off, hibernates or sleeps, the second wireless transceiver providing a signal to a remote transceiver indicating a security status of the motherboard.

In a further aspect, systems and methods are disclosed to secure an appliance by powering the appliance with a first power source; providing a wireless transceiver having a second power source independent of the first power source to allow the wireless transceiver to operate even if the appliance is inoperative; and determining a security status of the appliance through the wireless transceiver even if the appliance is inoperative.

Implementations of the above aspect may include one or more of the following. A base station can periodically communicate a heartbeat signal with the wireless transceiver. The wireless transceiver can transmit an acknowledgement of the heartbeat signal to the base station. The system can include a data storage device coupled to the processor in the appliance; and computer readable code executed by the processor to render inaccessible data on the data storage device if the wireless transceiver is separated from the processor or if the wireless transceiver fails to receive a heartbeat transmission from a base station. The second power source can be a battery or super capacitor. The transceiver can be a WiFi transceiver or Bluetooth transceiver. The wireless transceiver can be connected to an ExpressCard bus, PCI bus, PCIe bus, mini PCIe bus, or a USB bus. Computer readable code can be executed by the processor to encrypt and decrypt data in the appliance. An AES encryption unit can be connected to the wireless transceiver. Computer readable code can be executed by the processor to disable the appliance. Access to a network is granted if Media Access Control (MAC) addresses of the first and second wireless transceivers match pre-authorized MAC addresses.

In yet another aspect, a computer security apparatus includes a user key including a mobile device having a wireless transceiver; and a mobile device having a wireless transceiver in communication with the mobile device wireless transceiver, wherein the mobile authenticates the user key by detecting signals from the user key wireless transceiver.

Implementations of the above apparatus can include one or more of the following. The wireless transceiver communicates over WiFi or Bluetooth transmissions. The system includes code for sending and receiving authentication information to the laptop. The communications between the mobile device and the user key are secured by encrypting the message using public key cryptography. The system includes checking if the user is nearby, sending challenge message to the mobile phone and receiving validation message from the user key. The system can lock the computer or log out from an operating system if the user key is not nearby. The system can generate an alarm on the mobile device or the user key when the user key signal is not received within a predetermined period. The user key can be a mobile phone or another portable computer.

Advantages of the preferred embodiments may include one or more of the following. The system secures valuable items such as laptops, handheld computers, PDAs, and other items. In addition, the system secures invaluable data from falling into the wrong hands. The system mitigates problems arising from the forgetfulness of individuals, in addition to thievery. The system can be used for transportation and logistics, manufacturing and processing, and security. The system can be used for inventory tracking, or for high speed vehicle logging, among others.

DESCRIPTION

Figure 1:
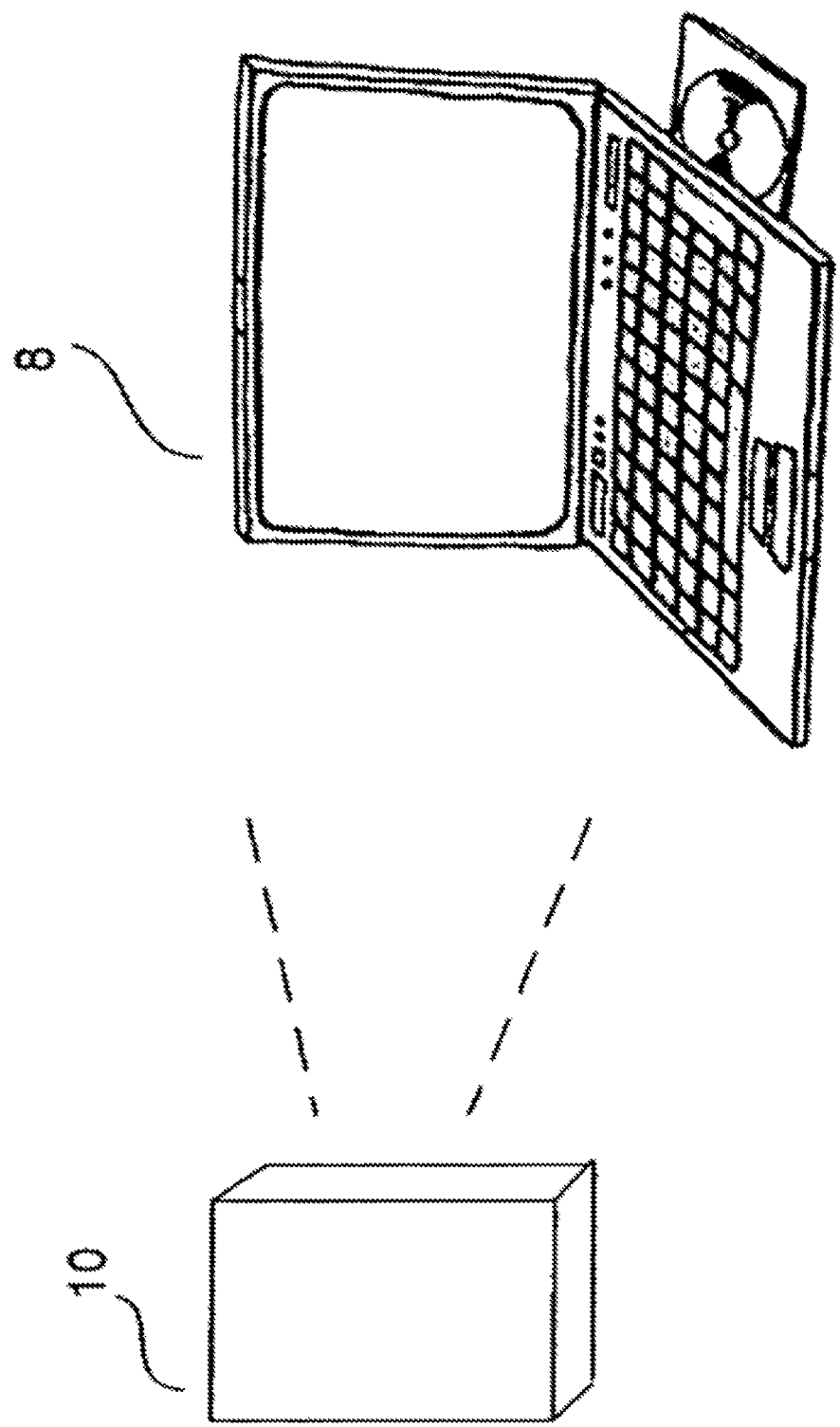
FIG. 1 is a simplified exemplary diagram of a cellular telephone that uses secure authentication to enable access a laptop according to an embodiment of the present invention.

FIG. 1 is a simplified exemplary diagram of a cellular telephone that uses secure authentication to enable access a laptop according to an embodiment of the present invention. A computing device 8 stores sensitive data, such as financial documents, business plans, etc. that are not meant to be accessed by other parties. The computing device 8 wirelessly communicates with a portable communication device 10. The computing device 8 may be a laptop computer, a personal digital assistant (PDA), an external hard drive, or any sort of electronic device that stores sensitive information or a high value device. The device 8 may be a laptop, desktop, hospital appliance such as a medical scanner, or other device that stores data. The cellular telephone device 10 is typically wirelessly linked to the computing device 8. The computing device 8 may also possess an operating system used to operate the device, such as Windows 7, Windows XP, Mac OSX, Linux, or the like. The portable communication device 10 can be a phone such as Apple's iPhone, Microsoft's WinCE, or Google's Android cell phones.

In one embodiment, the portable communication device 10 includes a wireless transceiver such as WiFi and/or Bluetooth for sending and receiving authentication information to the computing device 8. In one embodiment, the authentication information is sent directly to the data storage device and does not pass through the operating system of computing device 8. Hence, the authentication process is independent of the operating system of computing device 8 and any errors or security failures in the operating system do not affect the security of data storage device 10. Wireless transmissions may be sent by either device 8 or 100 in a variety of different wireless protocols, including but not limited to TCP/IP, 802.11, Bluetooth, and radio signals. In addition, the range of wireless transmissions may be limited to conserve the power of both the data storage device 10 and the device 8. For example, the range of wireless transmissions be 10 feet to allow for a compromise between device usability and security. Of course, other transmission ranges may also be implemented as well. The wireless transceiver may possess a low-power or "sleep" mode that conserves power when sending and receiving of wireless transmissions is not being performed. In this case, the wireless transceiver may use a polling function to periodically check if a message has been sent to it from the device 10. Alternatively the device may include a "button" to wake up the key device and start transmitting.

In a specific embodiment, counters may be maintained to check the number of times messages are sent or the number of times an incorrect message is sent to enhance security. For example, preprogrammed settings may only permit a fixed number of encrypted messages to be sent until the authentication process is stopped for a certain period of time. Correspondingly, only a certain number of incorrect decrypted messages may be accepted until the authentication process is halted.

Figure 2A:
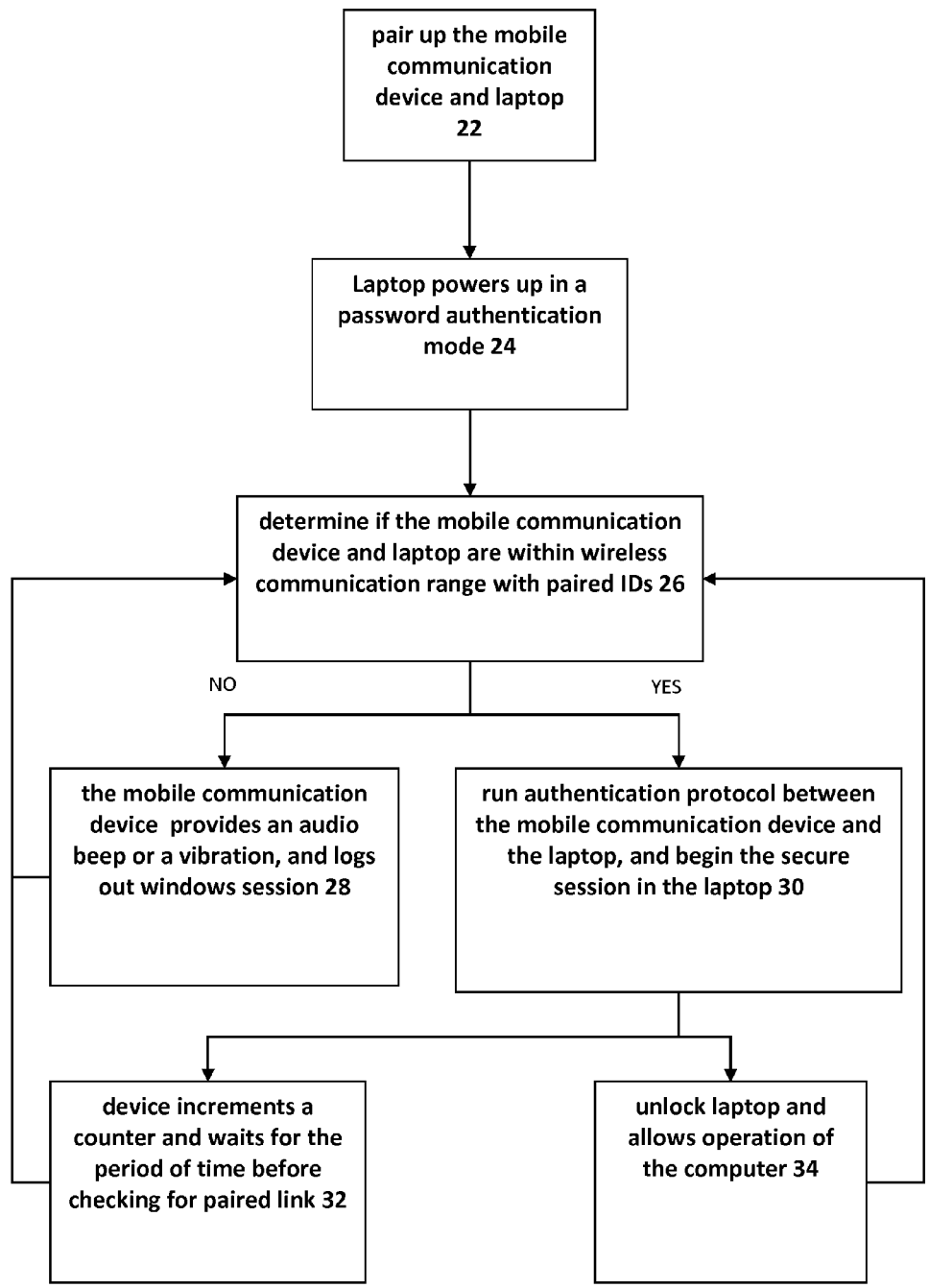
FIG. 2A is an exemplary simplified process showing wireless communication between a smart phone acting as the key device and a laptop according to an embodiment of the present invention.

The secure authorization established between key device 10 and laptop 8 does not last indefinitely. FIG. 2A is an exemplary simplified process showing wireless communication between a smart phone acting as the key device 10 and a laptop 8 according to an embodiment of the present invention.

In the embodiment of FIG. 2A, the system secures laptops 8 with the use of a mobile phone 10 as the wireless security key. The mobile phone uses a wireless transceiver such as WiFi and/or Bluetooth for sending and receiving authentication information to the laptop. This communication is secured by encrypting the message using public key cryptography. The system has two software components: a component on the mobile phone and a component on the laptop. The component on the laptop is responsible for checking if a mobile phone with the wireless security key is nearby, sending challenge message to the mobile phone and receiving validation message from the mobile phone. If the wireless security key is not nearby, the software component will log out from Windows system. Otherwise, it will log in or keep the logging in state. The component on the mobile is responsible for security validation.

In one implementation, the medium is Bluetooth. In the Bluetooth implementation, the typical range is about 10 m and the maximum range is about 100 m, and the system can simply default to a range of 10 m before an alarm is generated by detecting when the Bluetooth signal from the smart phone is lost.

In another implementation, the wireless link is 802.11 (WiFi). In the WiFi embodiment, the distance can be much greater than 100 m, and the software can detect range by scaling the RSSI (received signal strength indicator) flag from the WiFi transceiver chip so that the RSSI value corresponds to the predetermined range.

In yet a third implementation, the wireless link is a combination of 802.11 and Bluetooth.

After a secure authorization has already been obtained, for instance, the process maintains a secure authorization between the mobile device and the laptop. The process flow includes waiting until a predetermined period to elapse, reestablishing the secure channel between the wireless mobile device and the laptop. The process determines if the authentication succeeds or fails, and denying access to the laptop if the authentication fails.

Following the conclusion of the process flow of FIG. 2A, a secure authorization has been established between the laptop 8 and the mobile communication device 10. This authorization must be periodically refreshed to ensure that the laptop 8 is still within the immediate vicinity of the communication device 10. Thus, operations to the laptop 8 are permitted until a predetermined time has elapsed. After interval, the laptop 8 reestablishes the secure authenticated channel with the mobile device 10. If the authentication succeeds the device returns to the authenticated state and if not, the device goes to an unauthenticated state and will deny access to the laptop 8.

Figure 2B:
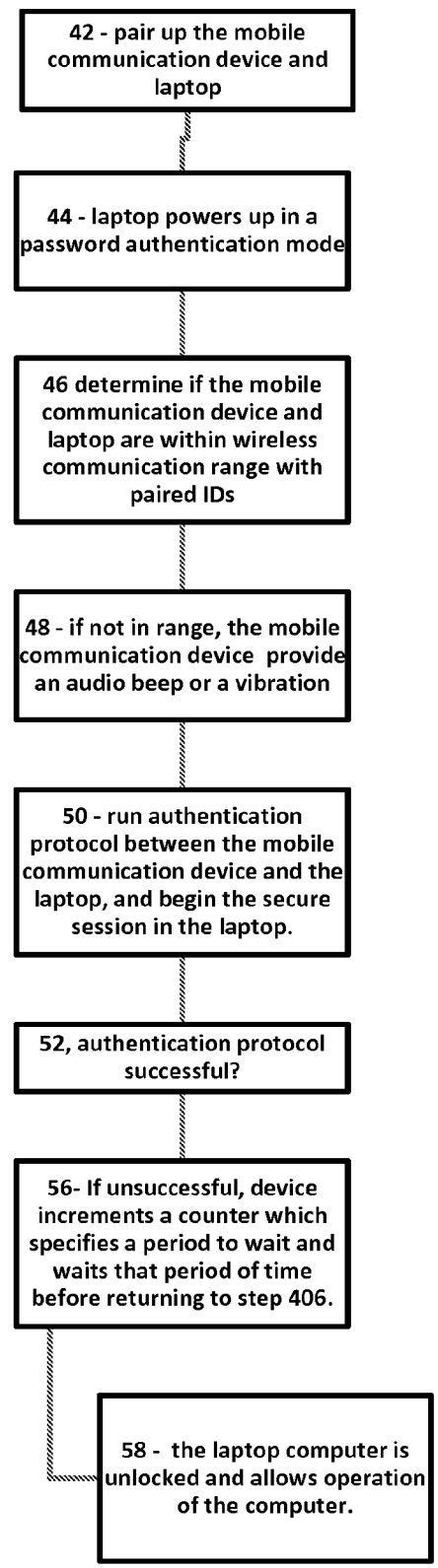
FIG. 2B is another exemplary diagram of a simplified process flow showing wireless communication between the mobile communication device and a laptop to establish a secure authorization according to an embodiment of the present invention.

FIG. 2B is another exemplary diagram of a simplified process flow showing wireless communication between the mobile communication device 10 and a laptop 8 to establish a secure authorization according to an embodiment of the present invention. The process flow includes step 42 to pair up the mobile communication device 10 and the laptop 8. In the pairing operation, the process determines the unique ID (such as the processor ID of both devices 8 and 10). During operation, in step 44, the laptop 8 powers up in a password authentication mode. In step 46, the process determines if the mobile communication device 10 and laptop 8 are within wireless communication range and that the paired IDs match. In 48, if not in range, the mobile communication device 10 can provide an audio beep or a vibration to indicate that the user has separated from the laptop. In step 50, the process executes an authentication protocol between the mobile communication device and the laptop, and to begin the secure session in the laptop. In step 52, the laptop 8 determines if the authentication protocol has been successful, if it has the process continues to step 54 and if not it continues to step 56. In step 56, the device increments a counter which specifies a period to wait and waits that period of time before returning to step 46. Optionally, a key to decrypt data on the storage device is sent from the mobile communication device to the laptop over the established authenticated communications channel. In step 54, the laptop computer 8 is unlocked and allows operation of the computer. In another embodiment, the laptop can use the key provided by the mobile device 10 to decrypt and encrypt data as required.

In one embodiment, the communication between the mobile device 10 and the laptop 8 is secured. In addition to encrypting the message using public key cryptography, the message may be additionally protected by using a digital certificate. A certificate authority functions as a trusted party known to both the laptop 8 and the cell phone 10. The certificate authority possesses both a public and private key, of which the private key is closely guarded. The public key of the mobile device 10 may be encrypted using the private key of the certificate authority. This constitutes a digital certificate that can be used to help authenticate different devices, in this case the mobile device 10 and the laptop 8 to each other using the certificate authority. The certificate may be stored in a data storage device with the unique public and private keys of the laptop.

In still another embodiment of the present invention, the electronics or motor within the laptop 8 will not function without having established a secure authorization between the mobile communication device 10 and the laptop 8. Power may be temporarily suspended to components within the laptop, or the motor may be prevented from operating until a secure authorization was established.

In other embodiments, the system can use a wireless transmitter in the cell phone that communicates with a central processing unit (CPU) located within the electronic device, such as a laptop. In this case the CPU of the laptop controls encryption and decryption of the data on the hard disk drive. When the wearable transmitter in the cell phone is in range of the receiver in the CPU, the encrypted data is decrypted and stored unencrypted onto the hard disk drive. When the user and wearable transmitter leave the location, the CPU encrypts the unencrypted data and saves the encrypted file, and then deletes the unencrypted file.

In another embodiment, the system can restrict the laptop power until a portable wireless transmitter is within range. By restricting power to the laptop or components such as a disk drive, operation of the laptop is disabled until the transmitter is in range of the device as the device is normally in a powered down state.

Figures 2C, 2D:
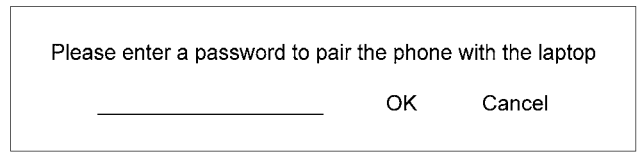
FIG. 2C shows an exemplary user interface presented on the laptop and/or the smart phone during initial pairing.
FIGS. 2D-2H shows exemplary user interface showing screens for setting authentication parameters between the smart phone and the laptop and user interface during operation of laptop and phone.
Figure 2E:
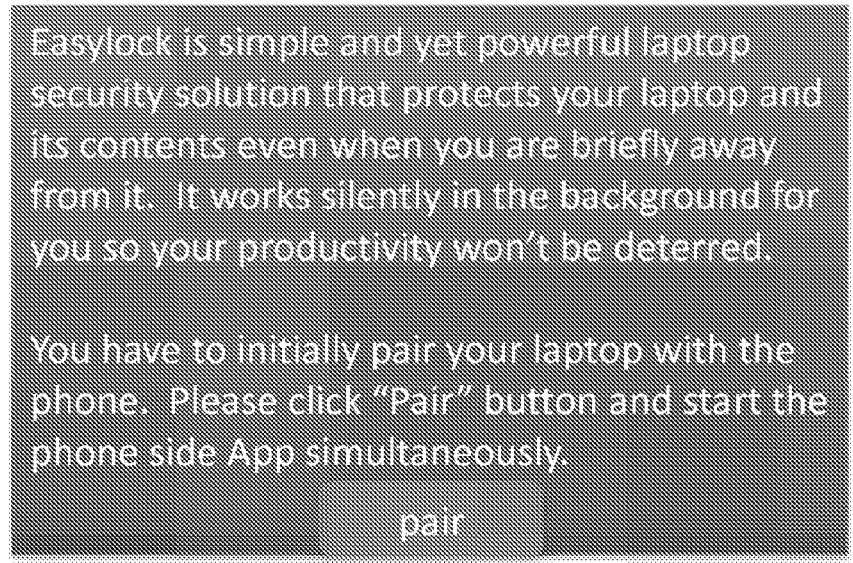
Figure 2F:
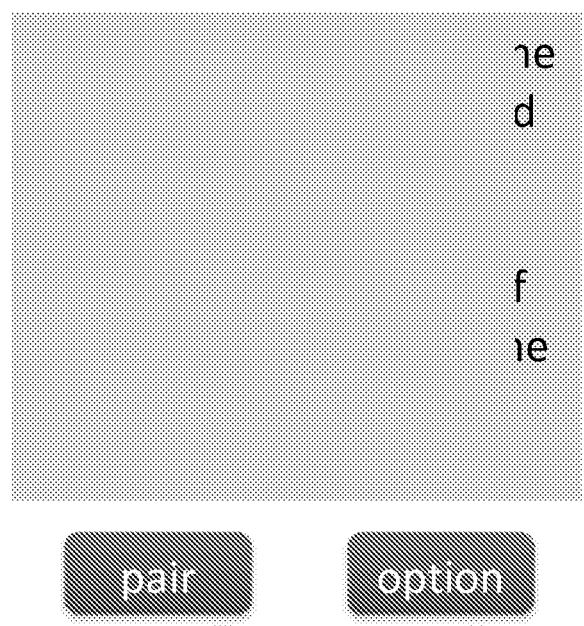
Figure 2G:
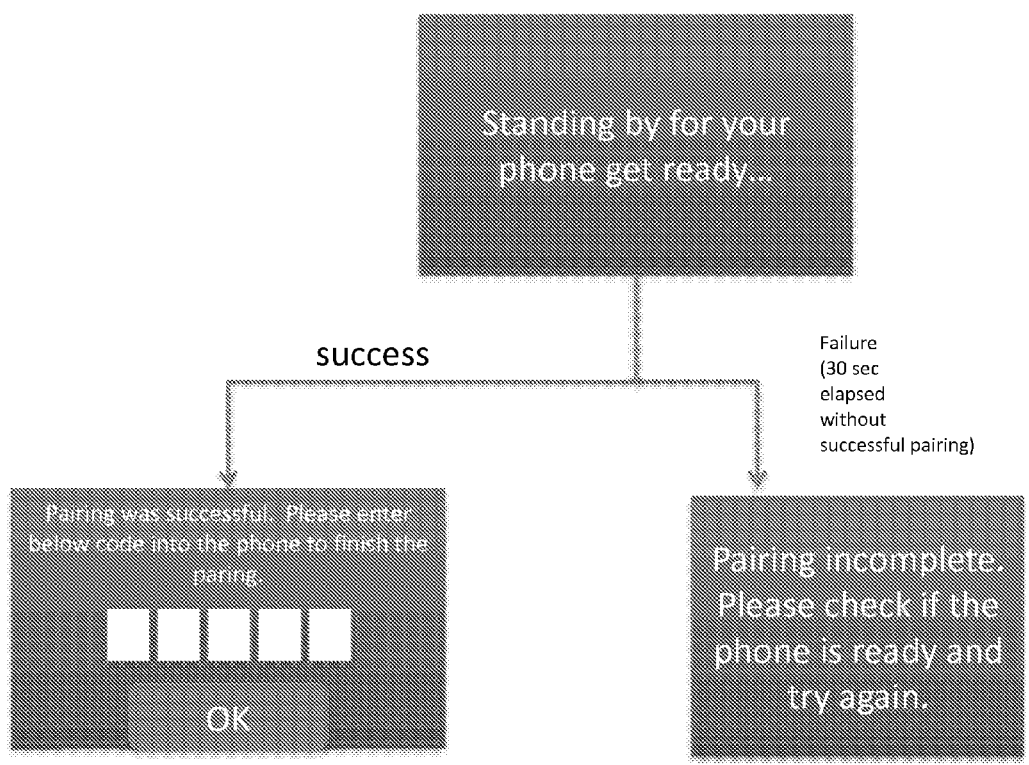
Figure 2H:
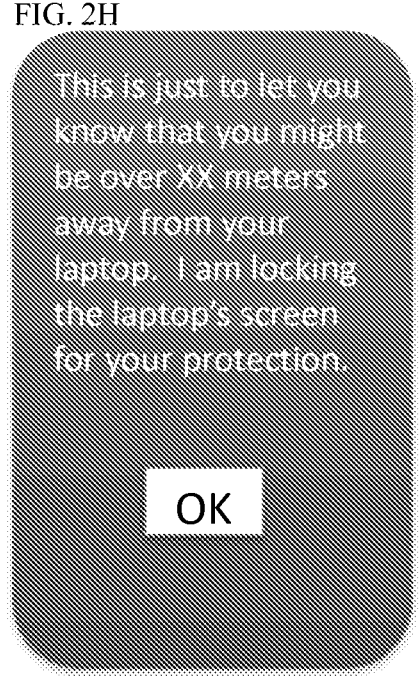

FIG. 2C shows an exemplary user interface presented on the laptop and/or the smart phone during initial pairing. In this process, the same password is entered on both the laptop and the smart phone, and when the user types in a matching password on the laptop or vice versa, the two devices are paired.

The host application that controls pairing includes a process to "unpair" and "re-pair" the laptop to a new phone. The same process is available to unpair and re-pair the phone to the laptop. FIG. 2D shows an exemplary user interface to specify and/or change parameters for securing the laptop.

Please enter parameters:

| | |
|---|---|
| Radius of mobile phone separation to sound alarm | _____ |
| Time to check presence of paired phone | _____ |
| Alarm Volume | _____ |
| Telephone number to call | _____ |
| SMS number to text alarm | _____ |
| Laptop login ID | _____ |
| Laptop login Password | _____ |

Other parameters include:
  Laptop System Configuration: set Idle times, waiting time, security key file loading, . . . .
  Mobile Phone System Configuration: laptop/mobile phone synchronization (synchronize security keys, other parameters, . . . ), wireless parameter set up, . . . .

Figure 3A:
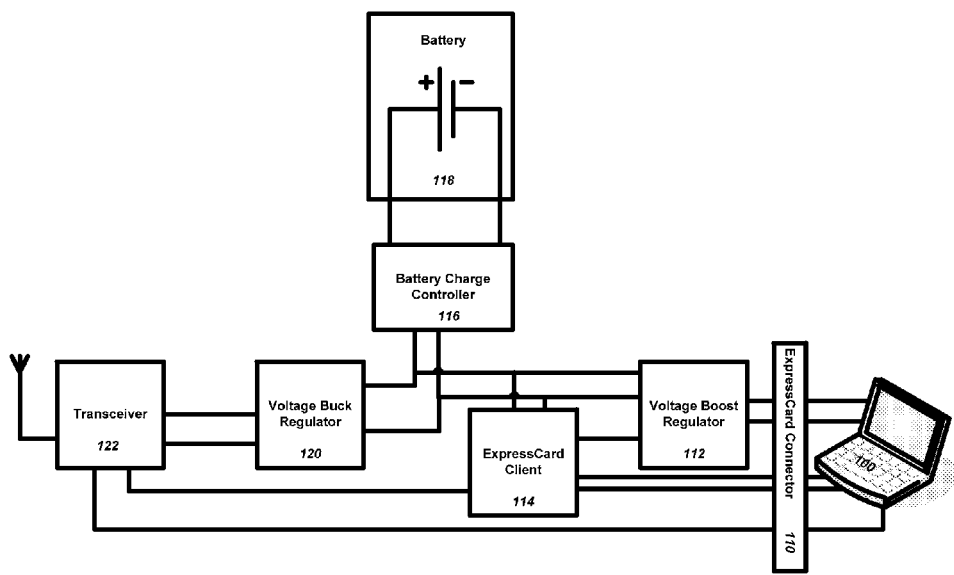
FIG. 3A shows an exemplary security card.

FIGS. 2D-2D shows exemplary user interface showing screens for setting authentication parameters between the smart phone and the laptop and user interface during operation of laptop and phone. During operation:
  User clicks an EasyLock icon in the laptop.
  A welcoming window asks the user to turn on the phone side app.
  User clicks EasyLock icon in the phone.
  After a successful pairing, the laptop side window displays a pairing code that user needs to enter in the phone side app.
  Once successfully paired, the phone app and laptop app both automatically turn on every time laptop/phone is on and work in the background Referring now to FIG. 3A, an exemplary security card for a computer 100 is shown. In this system, the computer 100 has an expansion port with a connector 110 such as an ExpressCard connector 110. The ExpressCard is an interface to allow peripheral devices to be connected to a computer.

The ExpressCard standard is implemented as one or more slots built into, usually, a portable computer, and cards to be inserted into a slot and containing electronic circuitry and connectors to which external devices can be connected. A voltage boost regulator 112 receives power from the connector 110 and powers the security card. The regulator 112 powers a voltage regulator 120 such as a buck regulator which in turn provides regulated power output. A wireless transceiver 122 communicates with a base station that in turn communicates with a network operations center (NOC) to periodically report position and authorized usage. A bus client 114 coordinates communications between the wireless transceiver 122 and software on the computer 100. To provide power to the transceiver 122 when the computer 100 is turned off, a battery 118 is provided. A charge controller 116 is connected to the boost regulator 112 to recharge the battery.

The ExpressCard standard specifies two form factors, ExpressCard/34 (34 mm wide) and ExpressCard/54 (54 mm wide, in an L-shape)—the connector is the same on both (34 mm wide). The ExpressCard offers lower cost, better scalability, and better integration with motherboard chipset technology than Cardbus. Standard cards are 75 mm long (10.6 mm shorter than CardBus) and 5 mm thick, but may be thicker on sections that extend outside the standard form for antennas, sockets, etc. The 34 mm slot accepts only 34 mm cards. The 54 mm slot accepts both 34 mm and 54 mm cards. A diagonal guide in the rear of the 54 mm slot guides 34 mm cards to the connector. Adapters are available for connecting an ExpressCard/34 card to a CardBus (but not 16-bit PC Card) slot. The major benefit of the ExpressCard over the PCMCIA CardBus PC card is more bandwidth, due to the ExpressCard's direct connection to the system bus over a PCI Express x1 lane and USB 2.0, while CardBus cards only interface with PCI. The ExpressCard has a maximum throughput of 2.5 Gbit/s through PCI Express and 480 Mbit/s through USB 2.0 dedicated for each slot, while all CardBus devices connected to a computer share a total 1.06 Gbit/s bandwidth.

Figure 3B:
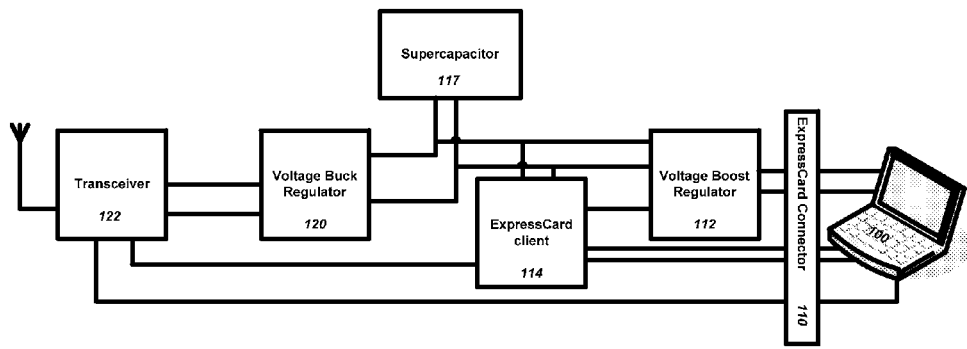
FIG. 3B shows a second embodiment of the security card.

FIG. 3B shows another embodiment of FIG. 1, where the battery 118 is replaced by a super capacitor 117. The super capacitor can be an electric double-layer capacitor. Electric double-layer capacitors, also known as super capacitors, pseudo capacitors, electrochemical double layer capacitors (EDLCs), or ultra capacitors, are electrochemical capacitors that have an unusually high energy density when compared to common capacitors, typically on the order of thousands of times greater than a high capacity electrolytic capacitor. For instance, a typical D-cell sized electrolytic capacitor will have a capacitance in the range of tens of millifarads. The same size electric double-layer capacitor would have a capacitance of several farads, an improvement of about two or three orders of magnitude in capacitance, but usually at a lower working voltage. Larger double-layer capacitors have capacities up to 5,000 farads as of 2010.

Figure 3C:
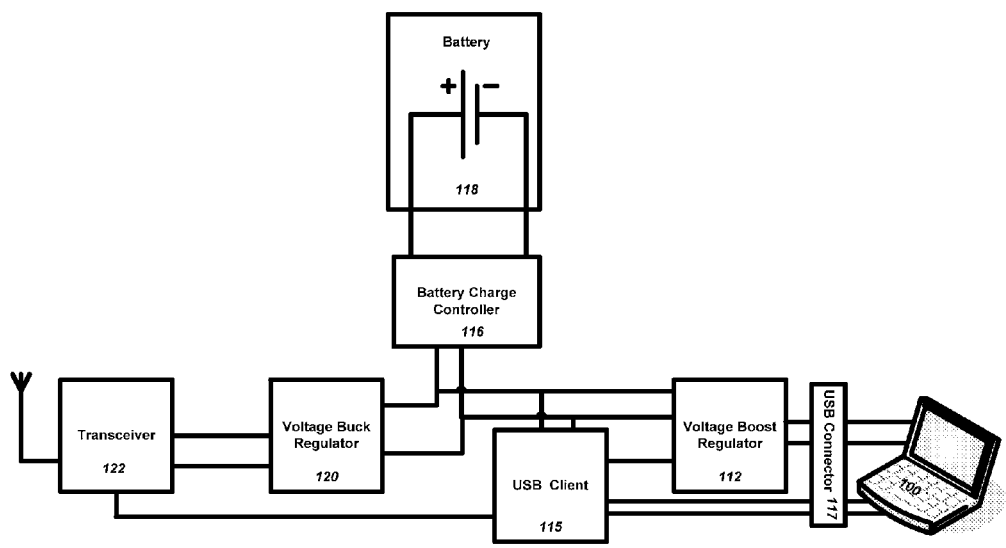
FIG. 3C shows a third embodiment of the security card.

FIG. 3C shows a USB embodiment of FIG. 1. In this embodiment, a USB dongle is connected to one USB port of the computer 100 through a USB connector 111. The transceiver 122 communicates with a USB client 115 which then communicates with software on the computer 100 through the USB port. Software on the host handles the virtual nature of USB communication pipes so that the embodiment can tell that it is physically plugged into the host USB socket. The USB system has an asymmetric design, consisting of a host, a multitude of downstream USB ports, and multiple peripheral devices connected in a tiered-star topology. Additional USB hubs may be included in the tiers, allowing branching into a tree structure with up to five tier levels. A USB host may have multiple host controllers and each host controller may provide one or more USB ports. Up to 127 devices, including the hub devices, may be connected to a single host controller. USB devices are linked in series through hubs. There always exists one hub known as the root hub, which is built into the host controller. So-called sharing hubs, which allow multiple computers to access the same peripheral device(s), also exist and work by switching access between PCs, either automatically or manually. They are popular in small-office environments. In network terms, they converge rather than diverge branches. A physical USB device may consist of several logical sub-devices that are referred to as device functions. A single device may provide several functions, for example, a webcam (video device function) with a built-in microphone (audio device function). Such a device is called a compound device in which each logical device is assigned a distinctive address by the host and all logical devices are connected to a built-in hub to which the physical USB wire is connected. A host assigns one and only one device address to a function.

USB device communication is based on pipes (logical channels). A pipe is a connection from the host controller to a logical entity, found on a device, and named an endpoint. The term endpoint is occasionally incorrectly used for referring to the pipe, although while an endpoint exists on the device permanently, a pipe is only formed when the host makes a connection to the endpoint. Therefore, when referring to the connection between a host and an endpoint, the term pipe should be used. A USB device can have up to 32 active pipes, 16 into the host controller and 16 out of the controller. A stream pipe is a uni-directional pipe connected to a uni-directional endpoint that transfers data using an isochronous, interrupt, or bulk transfer. A message pipe is a bi-directional pipe connected to a bi-directional endpoint that is exclusively used for control data flow. An endpoint is made into the USB device by the manufacturer, and therefore, exists permanently. An endpoint of a pipe is addressable with tuple (device_address, endpoint_number) as specified in a TOKEN packet that the host sends when it wants to start a data transfer session. If the direction of the data transfer is from the host to the endpoint, an OUT packet, which is a specialization of a TOKEN packet, having the desired device address and endpoint number is sent by the host. If the direction of the data transfer is from the device to the host, the host sends an IN packet instead. If the destination endpoint is a uni-directional endpoint whose manufacturer's designated direction does not match the TOKEN packet (e.g., the manufacturer's designated direction is IN while the TOKEN packet is an OUT packet), the TOKEN packet will be ignored. Otherwise, it will be accepted and the data transaction can start. A bi-directional endpoint, on the other hand, accepts both IN and OUT packets.

When a USB device is first connected to a USB host, the USB device enumeration process is started. The enumeration starts by sending a reset signal to the USB device. The data rate of the USB device is determined during the reset signaling. After reset, the USB device's information is read by the host, then the device is assigned a unique 7-bit address. If the device is supported by the host, the device drivers needed for communicating with the device are loaded and the device is set to a configured state. If the USB host is restarted, the enumeration process is repeated for all connected devices. The host controller directs traffic flow to devices, so no USB device can transfer any data on the bus without an explicit request from the host controller. In USB 2.0, the host controller polls the bus for traffic, usually in a round-robin fashion. The slowest device connected to a controller sets the bandwidth of the interface. For SuperSpeed USB (USB 3.0), connected devices can request service from host, and because there are two separate controllers in each USB 3.0 host, USB 3.0 devices will transmit and receive at USB 3.0 data rates, regardless of USB 2.0 or earlier devices connected to that host. Operating data rates for them will be set in the legacy manner.

Figure 4:
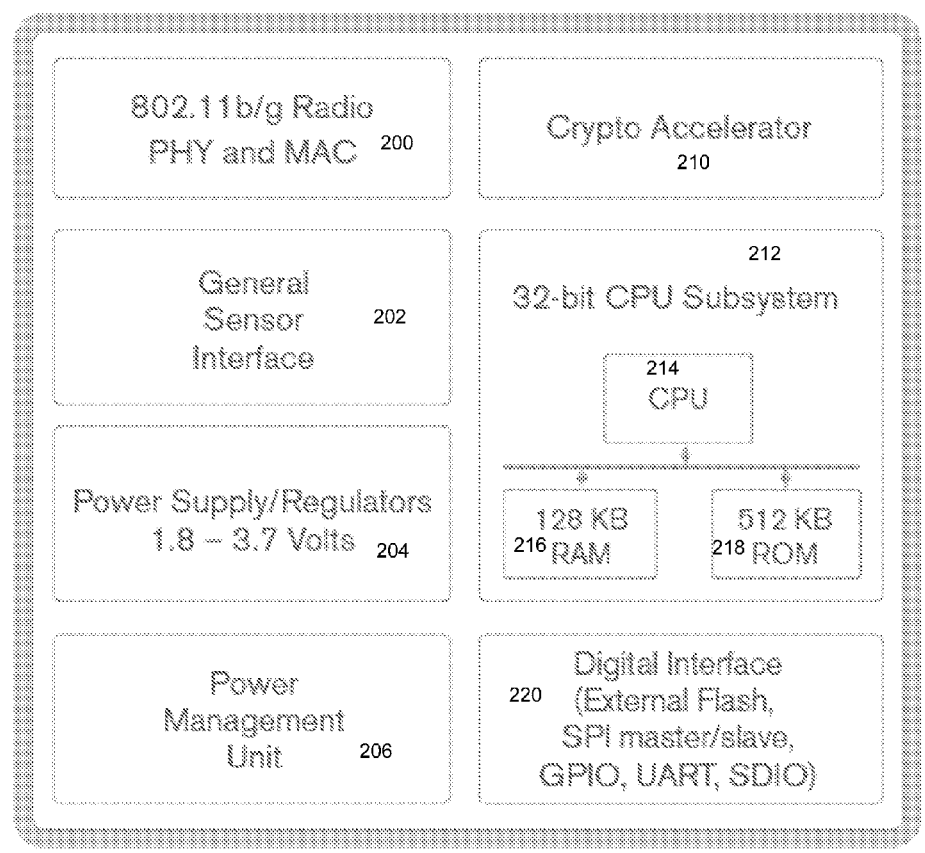
FIG. 4 shows an exemplary wireless transceiver device in the exemplary security card of FIGS. 3A-3C.

FIG. 4 shows an exemplary wireless transceiver. In FIG. 4, a WiFi based transceiver is used. In this transceiver, an 802.11b/g radio PHY and MAC 200 is provided on a core or chip. A sensor interface 202 is provided to allow the chip to detect if it is physically removed from the computer 100. A regulator 204 provides power to the chip, and a power management unit 206 optimizes power consumption so that the chip requires minimal power. A crypto accelerator 210 is provided with a processor system 212 that includes a CPU 214, RAM 216 and ROM 218. The chip communicates with the processor through a digital interface 220 that can be SDIO, I2C, GPIO or serial bus.

Figure 5:
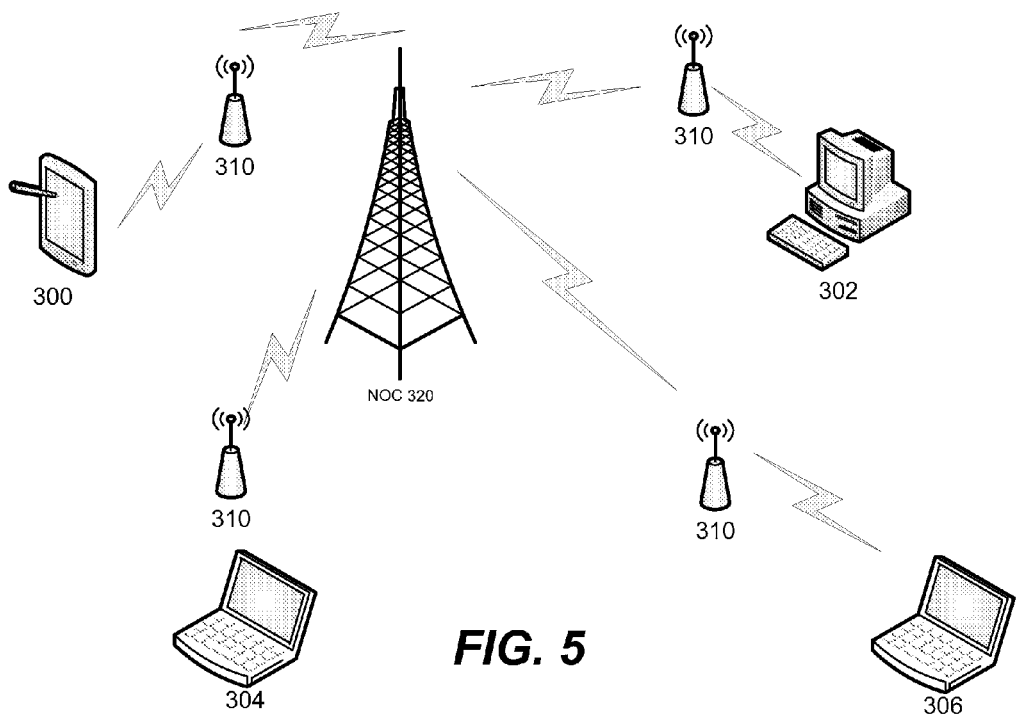
FIG. 5 shows an exemplary environment where high value electronic devices can be secured.

Alternatively, the PHY and MAC 200 can be compatible with ZigBee or Bluetooth. Referring now to FIG. 5, a secured system with a plurality of secured laptops, tablets, desktop computers, and other high value electronic devices 300-306 is shown. The devices 300-306 communicate with a plurality of distributed base units or access points 310 which in turn relay the information to a network operations center 320. In one embodiment, the base units relay data as well as the proximate location of the laptops 300-306. The base units know the position since their physical coordinates are known.

Position determination is the main component of navigation systems and any Location Based Services (LBS). Proliferation of WLAN access points in recent years created a blanket of WLAN radio waves everywhere. Therefore, almost in any place, there is a great possibility of detecting WLAN radio waves, especially in urban areas. The exponential growth of WLAN, and the fact that they can be found almost everywhere, initiated an idea of leveraging them for a metropolitan positioning system for indoor and outdoor areas. In a metropolitan WLAN positioning system, location of WLAN access points are used as reference points and the Received Signal Strength (RSS) of a WLAN access point is used as an indicator of a distance of an end user from the WLAN access points that the user detects at any time. By knowing the distance of the end user from WLAN access points, location of the end user can be determined.

Translating receiver Receive Signal Strength to distance relies on assuming a specific radio channel model. Ideally, if the radio channel model was exactly known, the exact distance of the end user to WLAN access points could be found.

To provide positioning information, various commercial offerings of Wi-Fi location systems targeted at indoor positioning can be used. These systems are designed to address asset and people tracking within a controlled environment like a corporate campus, a hospital facility or a shipping yard. These systems use a variety of techniques to fine tune their accuracy including conducting detailed site surveys of every square foot of the campus to measure radio signal propagation. They also require a constant network connection so that the access point and the client radio can exchange synchronization information similar to how a GPS works. While these systems are becoming more reliable for indoor use cases, they are ineffective in any wide-area deployment.

In another implementation using a Wi-Fi positioning system (WPS), a client positioning software can be executed by the computer 100. Throughout a particular coverage area there are fixed wireless access points that broadcast information using control/common channel broadcast signals. The client device monitors the broadcast signal or requests its transmission via a probe request. Each access point contains a unique hardware identifier known as a MAC address. The client positioning software receives signal beacons from the 802.11 access points in range and calculates the geographic location of the computing device using characteristics from the signal beacons. Those characteristics include the unique identifier of the 802.11 access point, known as the MAC address, and the strengths of the signal reaching the client device. The client software compares the observed 802.11 access points with those in its reference database of access points, which may or may not reside on the device as well. The reference database contains the calculated geographic locations and power profile of all the access points the gathering system has collected. The power profile may be generated from a collection of readings that represent the power of the signal from various locations. Using these known locations, the client software calculates the relative position of the user device and determines its geographic coordinates in the form of latitude and longitude readings. Those readings are then fed to location-based security application services run by the NOC 310.

In one embodiment, the system can classify WLAN access points based on their radio propagation characteristics in a WLAN based positioning system and to increase the accuracy of position, velocity and bearing estimations as discussed in U.S. Pat. No. 7,515,578, the content of which is incorporated by reference. Under certain embodiments, radio propagation characteristics of WLAN access points are estimated based on RSS samples in their coverage area. For example, radio propagation characteristics can be characterized by finding one or more signal power-distance gradients for at least one of the WLAN access points. Under other embodiments, the coverage area of a WLAN access point is divided into sectors, and radio propagation characteristics are determined for each sector, e.g., a signal power-distance gradient is found for each sector. For example, in a metropolitan area, the radio propagation characteristics of an access point is not symmetric across its coverage area, i.e., the characteristics vary in different directions. Under embodiments of the invention, the 360 degree coverage area of the WLAN access point is divided into multiple sectors when coverage of the WLAN access point is not symmetric in all of the directions. The sectors may be divided according to radials emanating from the estimated location of the WLAN access point. After selecting number of sectors, radio propagation characteristics need to be calculated for each sector. Note that if number of RSS samples in one sector is not enough to estimate radio propagation characteristics in that sector, the average of the characteristics of the adjacent sectors may be used. In one embodiment, the radio propagation characteristics of a WLAN access point can be presented by a piecewise linear estimation. This may be accomplished by dividing the coverage area of the WLAN access point into multiple tiers and finding the radio propagation characteristics for each tier. This method can be used to increase the accuracy of RSS power to distance translation, e.g., when a WLAN access point coverage area consists of indoor and outdoor environments. Thus, this approach may be used to capture indoor and outdoor radio propagation characteristics differently by estimating a signal power-distance gradient for each tier. The average radius of the coverage area of a WLAN access point can be calculated and used to estimate the signal power-distance gradient. The average radius of coverage area can be used as an indicator of the signal power-distance gradient because the signal power-distance gradient is the ratio of RSS power to distance from the WLAN access point. The signal power-distance gradient value directly impacts the radius of coverage area of the WLAN access point. Because the receiver sensitivity is the same for all scanning devices taking RSS samples, the radius of coverage area of the WLAN access point can be used as an indicator of the value of signal power-distance gradient. In order to find the radius of coverage area of the WLAN access point and avoid the impact of fast fading on the RSS power reading, and subsequently on the coverage, the standard deviation of the radius of coverage area instead of absolute radius of coverage area is used. In other words, absolute value of the radius of coverage area depends on a limited number of readings at the edge of the coverage, but standard deviation is calculated based on the total number of RSS samples and reduces the impact of power variation at the edge of the coverage area, while at the same time indicating the size of the coverage area.

In one embodiment, the NOC detects the presence of the laptop within an office perimeter and enables the laptop to operate only when the laptop is within the authorized perimeter. Once the device is taken outside of this area, the laptop operations are disabled. This embodiment thus locks up the laptop and prevents asset theft.

In another embodiment, the data storage device of the laptop is encrypted to provide protection against unauthorized access to data stored on the laptop.

In yet another embodiment, the hard drive of the laptop is encrypted and controlled by the NOC. The NOC generates the encryption key and initiates encryption of the drive with the key during laptop software installation. Periodically, the NOC transmits the key to the laptop to allow the laptop hard drive to be accessible. An encryption module 200 such as a software system for establishing and maintaining an on-the-fly-encrypted volume (data storage device) is used to protect sensitive data on the data storage device of the computer 100. In one embodiment, the encryption software can be Truecrypt, available at www.truecrypt.org. On-the-fly encryption means that data is automatically encrypted or decrypted right before it is loaded or saved, without any user intervention. No data stored on an encrypted volume can be read (decrypted) without using the correct password/keyfile(s) or correct encryption keys. Entire file system is encrypted (e.g., file names, folder names, contents of every file, free space, meta data, etc).

Files can be copied to and from a mounted using the encryption module 200 volume just like they are copied to/from any normal disk (for example, by simple drag-and-drop operations). Files are automatically being decrypted on the fly (in memory/RAM) while they are being read or copied from an encrypted volume. Similarly, files that are being written or copied to the encrypted volume are automatically being encrypted on the fly (right before they are written to the disk) in RAM. The whole file that is to be encrypted/decrypted does not need be stored in RAM before it can be encrypted/decrypted. There are no extra memory (RAM) requirements for the encryption.

For example, if a user wishes to access an .avi video file stored in the encrypted drive (therefore, the video file is entirely encrypted). The NOC transmits the correct password (and/or keyfile) and mounts (opens) the volume encrypted by the encryption module 200. When the user double clicks the icon of the video file, the operating system launches the application associated with the file type—typically a media player. The media player then begins loading a small initial portion of the video file from the encryption module 200-encrypted volume to RAM (memory) in order to play it. While the portion is being loaded, the encryption module 200 is automatically decrypting it (in RAM). The decrypted portion of the video (stored in RAM) is then played by the media player. While this portion is being played, the media player begins loading next small portion of the video file from the encryption module 200-encrypted volume to RAM (memory) and the process repeats. This process is called on-the-fly encryption/decryption and it works for all file types, not only for video files.

The encryption module does not save any decrypted data to a disk—it stores them temporarily in RAM (memory). Even when the volume is mounted, data stored in the volume is still encrypted. When you restart Windows or turn off the computer 100, the volume will be dismounted and files stored in it will be inaccessible (and encrypted). Even when power supply is suddenly interrupted (without proper system shut down), files stored in the volume are inaccessible (and encrypted). To make them accessible again, the system needs to mount the volume (and provide the correct password and/or keyfile).

When the computer has a multi-core processor/CPU (or multiple processors/CPUs), the encryption module 200 uses all of the cores (or processors) in parallel for encryption and decryption. For example, when the encryption module 200 is to decrypt a chunk of data, it first splits the chunk into several smaller pieces. The number of the pieces is equal to the number of the cores (or processors). Then, all of the pieces are decrypted in parallel (piece 1 is decrypted by thread 1, piece 2 is decrypted by thread 2, etc). The same method is used for encryption. Thus, if the computer 100 has, for example, a quad-core processor, then encryption and decryption are four times faster than on a single-core processor with equivalent specifications (likewise, they are twice faster on dual-core processors, etc). When the computer has a multi-core processor/CPU (or multiple processors/CPUs), header key derivation is parallelized too. As a result, mounting of a volume is several times faster on a multi-core processor (or multi-processor computer) than on a single-core processor (or a single-processor computer) with equivalent specifications.

Figure 6:
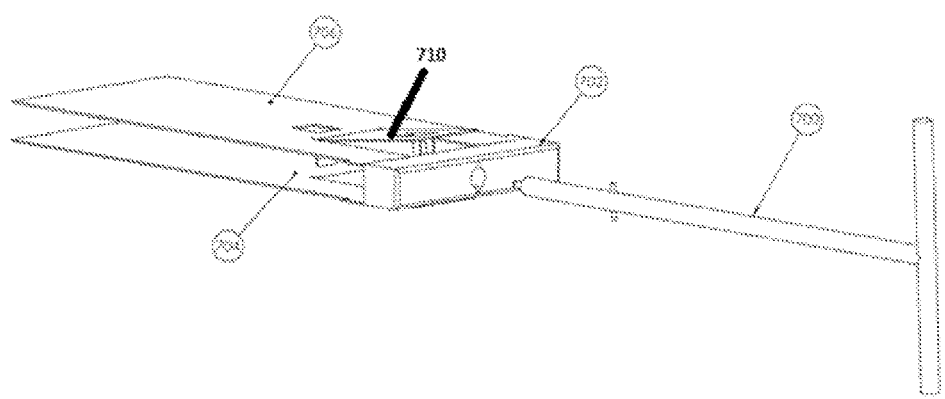
FIG. 6 shows an exemplary physical lock for the system of FIG. 1.

FIG. 6 shows an exemplary physical lock for the system of FIG. 1. A steel enclosure 706 houses the electronics of FIG. 1. The enclosure has cutouts and bends in the form of extendable arm 710 in space 704 that will spring outward when the card is inserted into its corresponding slot in the laptop or computer. To remove the unit, the extendable arm 710 needs to be lowered back into space 704, and a special key 700 is provided to authorized-personnel such as the IT administrator for this purpose. As shown in FIG. 6, an authorized user such as an IT administrator inserts the key 700 and turns the key for a predetermined direction (such as clockwise 120°) and pull gently on the key. Turning the key would pull the flaps back toward the key, allowing the card to be removed normally. Otherwise, the flaps extend outwardly from the steel enclosure and the electronics of FIG. 1 are securely embedded in the computer. This embodiment can be done for the Express Card as well as PCMCIA Card, or any other card that can be inserted into a slot where an extendible arm can be deployed to secure the card inside the laptop.

Figure 7A:
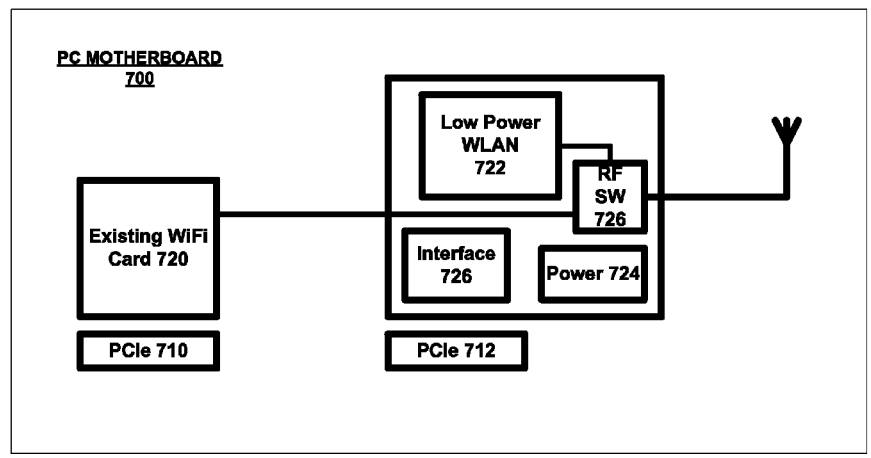
FIGS. 7A-7G show exemplary internally positioned laptop security systems.

FIG. 7A shows an internal embodiment that can be plugged into a laptop's internal expansion bus such as a mini-PCIe bus. In FIG. 7A, an existing wireless local area network (WLAN) such as a WiFi card 720 can be inserted into a first bus 710 on a PC motherboard 700. An add-on card can be plugged into a second bus 712. The add-on card contains a low power WLAN transceiver 722 that communicates with the bus 712 through an interface 726. The add-on card can carry its own rechargeable power source 724 such as a battery or a supercapacitor. An RF switch 726 allows either the WiFi card 720 or the low power WLAN 722 to communicate through an antenna. The antenna is typically on the back of the display LCD of the laptop to provide good RF transmission. The RF output of the WiFi card 720 can be connected through a cable or a jumper wire to the RF switch 726.

Figure 7B:
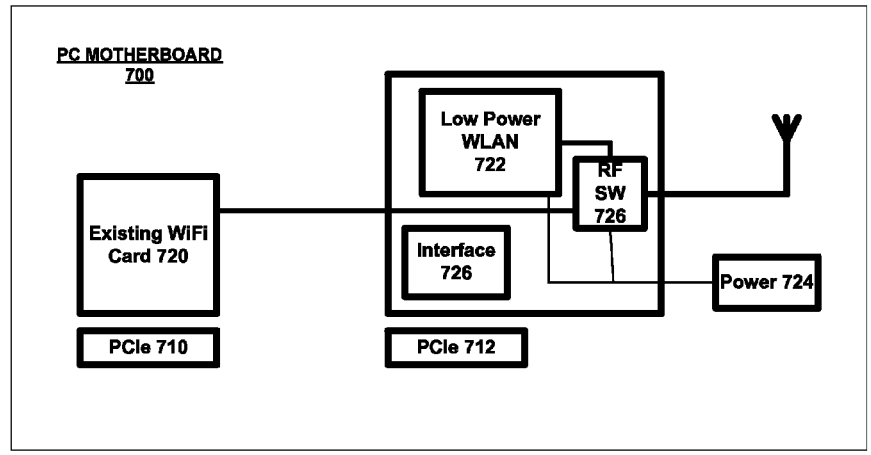

FIG. 7B shows an embodiment where the power source 724 is not provided on the add-on board. In this embodiment, the laptop's battery is used, and direct power is connected between the laptop battery and the low power WLAN 722 and the RF switch 726 by way of a jumper cable. In this manner, the add-on card can tap the power from the laptop's battery to avoid the need for its own power source to save cost and weight and size issues present in FIG. 7A.

Figure 7C:
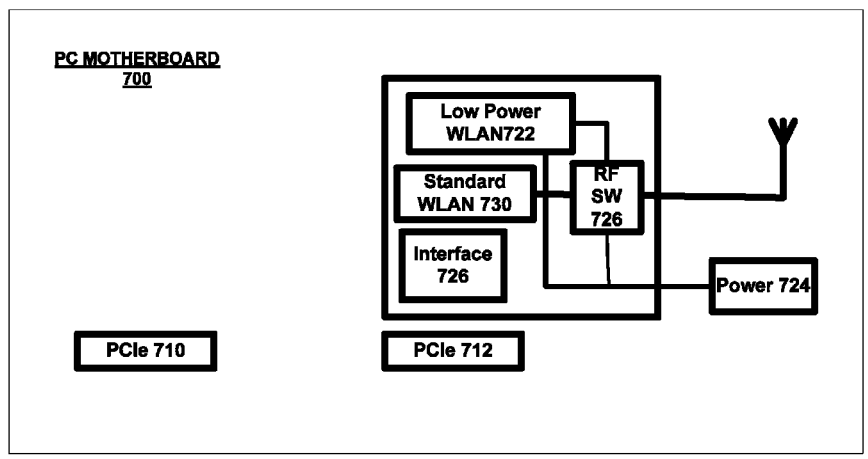

FIG. 7C shows an embodiment where the add-on card replaces an existing WLAN card for a laptop. In this embodiment, a standard high power WLAN transceiver 730 is provided on the add-on card. The high power WLAN transceiver 730 is active only when the laptop is operating. Power to the WLAN transceiver 730 is reduced when the laptop enters stand-by or hibernate mode; however, power to the low power WLAN 722 is maintained regardless of the condition of the laptop so that positioning beacons can be sent when the laptop is inactive or turned off. The embodiment of FIG. 7C uses electricity from the laptop's battery to power the low-power WLAN 722. The inventors contemplate that the embodiment of FIG. 7C can carry its own dedicated power source such as the power arrangement of FIG. 7A.

Figure 7D:
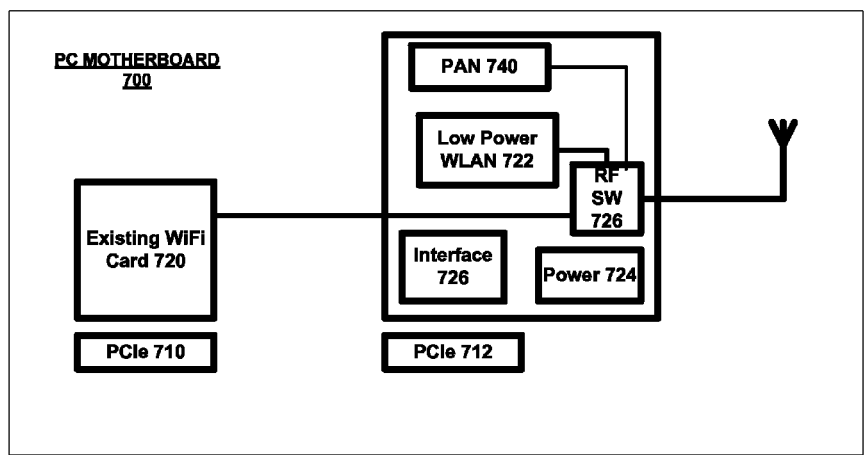

Turning now to the embodiment of FIG. 7D, a personal area network (PAN) device 740 is added. The PAN 740 can be Bluetooth or Zigbee transceivers, for example. Similar to the low power WLAN 722, the PAN device 740 also receives power when the laptop is off.

Figure 7E:
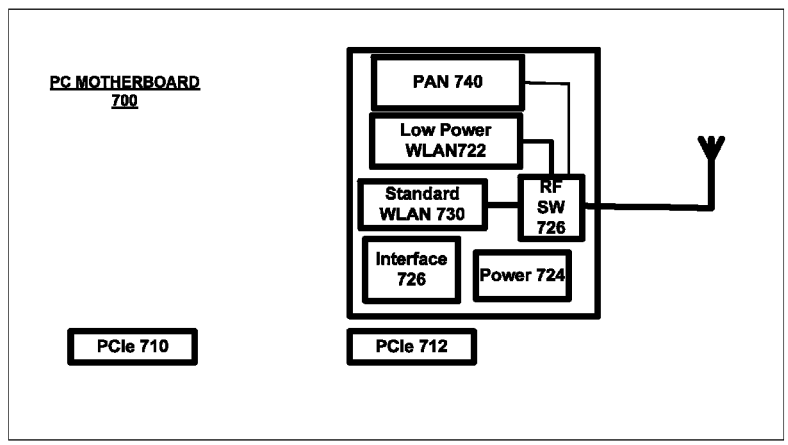
Figure 7F:
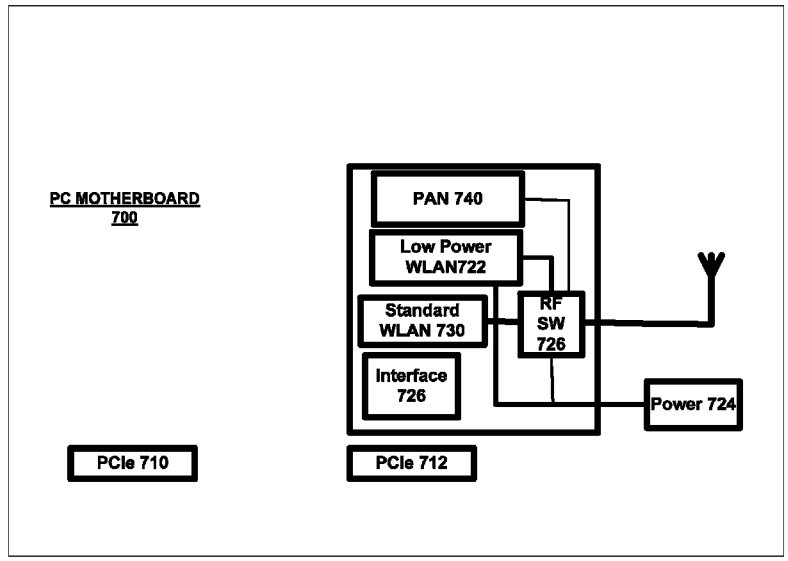

FIG. 7E shows an arrangement that replaces an existing WLAN card for a laptop with a full function add-on card that includes regular WiFi standard high power WLAN transceiver 730, the low power WLAN 722, and the PAN 740 on the add-on card. Power to the WLAN transceiver 730 is cut when the laptop enters stand-by or hibernate mode; however, power to the low power WLAN 722 and PAN 740 is maintained regardless of the condition of the laptop so that positioning beacons can be sent when the lap top is inactive or turned off. The embodiment of FIG. 7E carries its own dedicated power source on board the card, while the embodiment of FIG. 7F uses electricity from the laptop's battery to power the low-power WLAN 722.

Figure 7G:
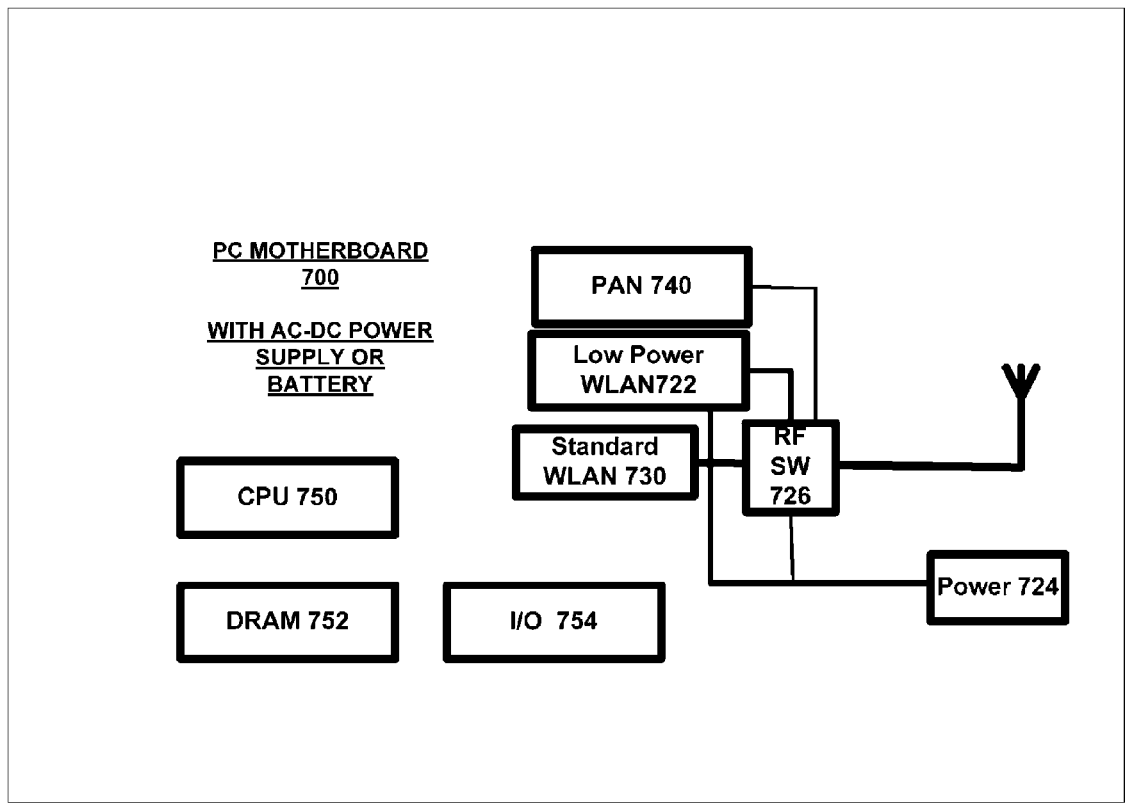

FIG. 7G shows an exemplary embodiment where low power WLAN 722 and PAN transceiver 740 are directly on the PC motherboard, and the power to the low power WLAN 722 and PAN transceiver 740 is maintained regardless of the condition of the laptop so that positioning beacons can be sent when the lap top is inactive or turned off. The standard WLAN 730 can be on a PCIe board connected to the motherboard via a connector or can be directly mounted on the motherboard. The CPU 750, DRAM 752, and I/O ports 754 are on the motherboard 700, as is conventional.

A secured system with a plurality of secured laptops, tablets, desktop computers, and other high value electronic devices is discussed next. The devices communicate with a plurality of distributed base units or access points which in turn relay the information to a network operations center. In one embodiment, the base units relay data as well as the proximate location of the laptops. The base units know the position since their physical coordinates are known.

TPM 212 is the hardware instantiation of a Trusted Computing Platform Alliance (TCPA) subsystem. The TCPA subsystem, whose specification is described in TCPA Main Specification Version 1.1 and TCPA PC Specific Implementation Specification, Version 1.00, which are incorporated herein by reference, includes TPM 212 and software to control the TCPA subsystem. Coupled to the TPM 212, the processor 206, the storage device 204 is the BIOS 210, a circuit capable of interfacing and communicating with other devices (not shown), typically through a computer network. TPM 212 includes a TPM processor 218, which is capable of encoding/decoding messages received from I/O 202, as well as generating asymmetric pairs of public/private keys. Also included within TPM 212 is the stored root key (SRK) 220. The storage device 204 includes an encrypted symmetric key blob 214 and an encrypted encryption key blob 216 provided during set-up.

To set up the system, the system retrieves a storage root key (SRK) that allows authorized people to use the machine. Next a non-migratable binding key that can only be used on this system is created in the TPM. The non-migratable binding key is stored. Thereafter, using the binding public key, a symmetric key is wrapped. Thereafter, valid data of the encrypted symmetric key is stored in a secure storage medium such as a hard disk drive as a blob.

After the system is set up, only the authorized user can utilize the computer. FIG. 2 is a block diagram of a computer system 200 in accordance with the present invention. The system 200 includes a processor 206, a storage device 204 which is preferably a hard disk drive or alternately any other type of mass storage device, a Basic Input/Output System (BIOS) 210 and a Trusted Platform Module (TPM) 212.

Figure 8:
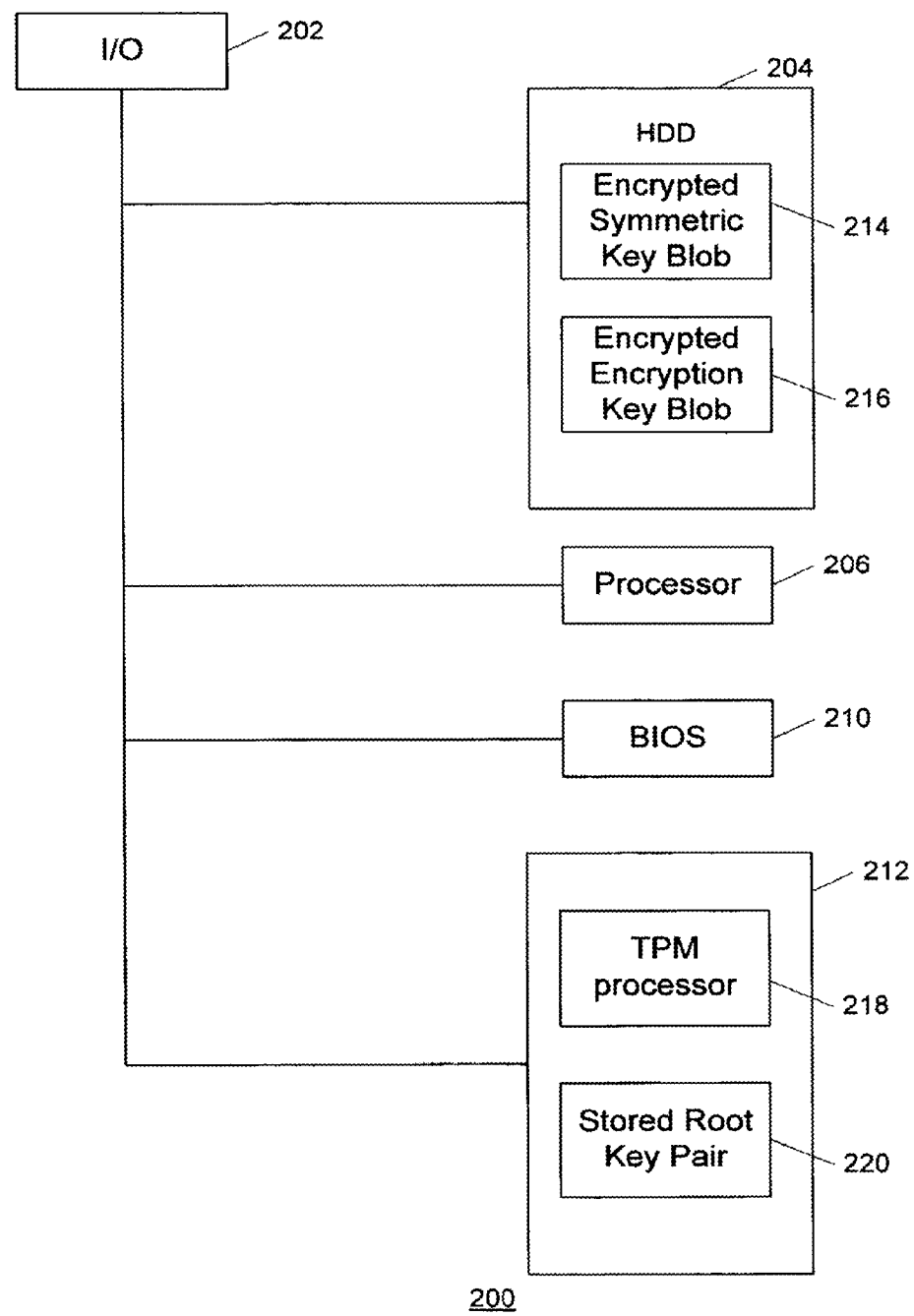
FIG. 8 shows a block diagram of a computer system.
Figure 9:
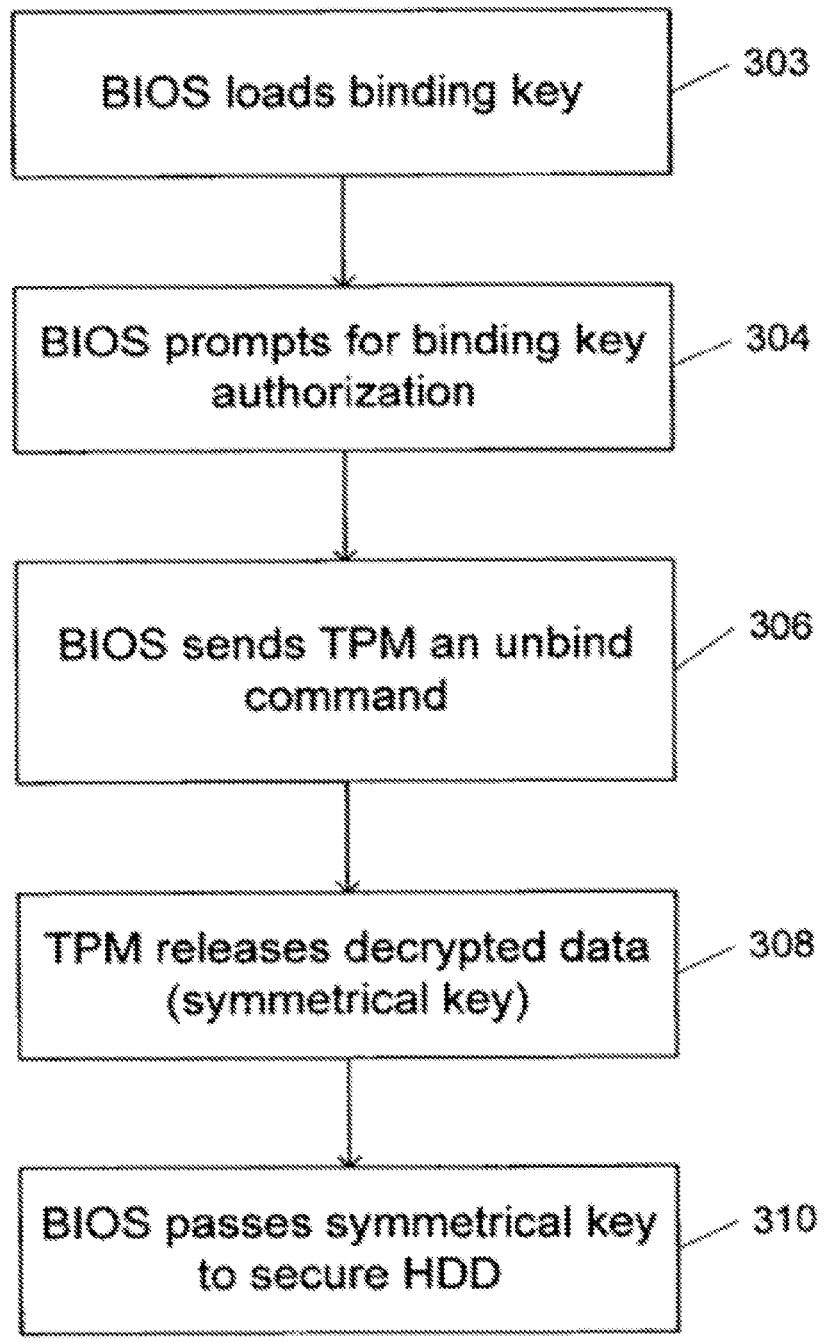
FIG. 9 is a flow chart which illustrates the use of the computer of FIG. 8.

FIG. 9 is a flow chart which illustrates the use of the computer 200 in accordance with the present invention. Referring to FIGS. 8 and 9 together, first, the BIOS 210 loads a binding key in 302. Then the BIOS 210 performs binding key authorization by checking for the keep-alive signal from the wireless base stations in 304. In another embodiment, the BIOS 210 performs binding key authorization by requesting for a password code from the wireless base stations in 304. Alternatively, the BIOS 210 performs for binding key authorization by checking for the keep-alive signal from the wireless base stations in 304 and a password from the user. In another embodiment, to allow the user to operate temporarily for a predetermined duration when outside of the authorized area, the BIOS 210 prompts for binding key authorization by checking for a user password from the wireless base stations in 304.

Once binding key authorization is obtained, the BIOS 210 sends an unbind command to the TPM 212 to provide the decrypted key in 306. The unbind command includes the encrypted symmetric key and an authorization digest which is derived from the password authorization prompt. The authorization digest is defined as using this payload for this command during this instance. Therefore using this encrypted symmetric key the authorization is approved.

After the BIOS 210 sends the TPM 212 the unbind command via step 306, the TPM 212 releases the decrypted symmetric key in 308. Thereafter the BIOS 210 passes the decrypted symmetric key to the storage device 204 in 310, which allows for the use of the system.

Accordingly, by utilizing a secure hard disk drive (HDD) that requires a decrypted key to function in conjunction with a TPM, a computer if stolen is virtually unusable by the thief. In so doing, the risk of theft of the computer is significantly reduced.

One embodiment works with Intel Anti-Theft Technology (Intel AT) built into the processor of the laptop, so it is active as soon as the machine is switched on—even before startup. If the laptop is lost or stolen, a local or remote "poison pill" can be activated that renders the PC inoperable by blocking the boot process. This means that predators cannot hack into the system at startup. It works even without Internet access and, unlike many other solutions, is hardware-based, so it is tamper-resistant. Since it is built-in at the processor level, the IT administrator has a range of options to help secure mobile assets, such as:

Disable access to encrypted data by deleting essential elements of the cryptographic materials that are required to access the encrypted data on the hard drive.

Disable the PC using a "poison pill" to block the boot process, even if the boot order is changed or the hard drive is replaced or reformatted.

Customizable "Theft Mode" message allows the IT administrator to send a message to whoever starts up the laptop to notify them that it has been reported stolen.

Excessive login attempts trigger PC disable after an administrator-defined number of failed attempts. At this point, the AT trigger is tripped and the system locks itself down.

Failure to check in with the central server can trigger PC disable when a check-in time is missed. The IT administrator can set system check-in intervals. Upon a missed check-in time, the system is locked down until the user or IT administrator reactivates the system.

Businesses now have built-in client-side intelligence to secure sensitive data, regardless of the state of the operating system, hard drive, boot order, or network connectivity. The hardware-based technology provides compelling tamper resistance and increased protection to extend security capabilities anywhere, anytime—on or off the network.

The system turns the mobile phone into a personal trusted device (PTD) having processing and storage capabilities allowing it to host and operate a data aggregation software application useful for managing and manipulating information. Devices falling within this definition may or may not include a display or keyboard, and include but are not limited to cell phones, wireless communication tablets, personal digital assistants, RF proximity chip cards, and laptop personal computers.

In yet another embodiment, the system uses a smart phone with a Near Field Communication transceiver and turns the device in to an electronic wallet. The system allows computer users to have exactly the same computing experience on any machine. The system enables users to store their personal computer settings on their mobile phone, and then transfer those settings to another computer with a flick of the wrist. The phone allows users to carry a lot of their desktop applications, settings and data in the flash drive, and load that data on to another computer. It will be as though the user is sitting at his own machine at home or work. When the user leaves, and the NFC-equipped phone is out of range, the host machine returns to its previous state. The system would essentially turn any computer in to the user's own, like the user is actually working on his computer; same settings, look, bookmarks, preferences. It would all be invisible. The phone would be all that is needed to unlock the computer.

The system also converts the cell phone in to an "e-wallet", allowing owners to wave their phone over a contact pad in order to pay for items such as coffee, books or CDs in participating retailers. In accordance with embodiments of the present invention, a PTD may securely import information from a source utilizing encryption technology. The information to be imported is first encrypted. The encrypted information is then transmitted from a source to the PTD. The encrypted information is then stored by the PTD. Prior or subsequent to communication of the encrypted information, a decryption key is sent to the PTD user through a separate communication channel or utilizing a second device in order to establish a strong non-repudiation scheme. In accordance with one embodiment of the present invention, a PTD may securely import information from a source such as a magnetic stripe card or a second PTD utilizing an interface device. The interface device includes a receiver for receiving information from the source, and a short-range wireless transceiver such as an IR transceiver for communicating with the PTD. The interface device may also feature a cryptoprocessor including an embedded encryption key. Information communicated from the source to the interface device is encrypted with the key and then transmitted to the PTD in encrypted form. The user of the PTD may then decrypt the imported information using a corresponding decryption key communicated to the user through a separate channel. For example, the decryption key may be mailed to the home address of the PTD user as part of a periodic credit card billing statement.

As used herein, the term "encryption" refers to imparting a single, discrete layer of security to information imported into a PTD. Information that is encrypted/decrypted according to the present invention may already be in encrypted format based upon one or more previously-imposed additional security procedures that are outside the scope of the instant patent application. Thus upon decryption of imported information in accordance with embodiments of the present invention, such already-encrypted information may not be immediately available to the PTD user, but may require further decryption processes. For example, the code read from a magnetic stripe card and stored in the phone PTD may be in encrypted form even before it is encrypted for PTD importation according to embodiments of the present invention. In certain embodiments the encrypted information may comprise credit card account information, such as for a new card to be activated by the user of the PTD. Upon successful decryption of the new credit card account information, the system software may direct the PTD to send a message notifying the credit card issuer of activation of the card, removing any remaining barriers to its use. Such a procedure would obviate the conventional activation process that typically requires the user to first call a telephone contact center in order to active a new credit card account.

In accordance with an alternative embodiment of the present invention, the decryption key could be forwarded to the user of a PTD through another type of separate communication channel. For example, a server administered by the information may host a secure web site accessible by the user only upon entry of certain confidential parametric information. Once accepted within the website, the decryption key could be communicated to the PTD user as an email or other type of electronic message.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device.

By way of example, a computer to support the system is discussed next. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A security system, comprising:
   a mobile device to be secured, comprising:
      a processor;
      a data storage device coupled to the processor;
      a standard wireless 802.11 protocol transceiver configured to access a data network, powered by a main power source of the mobile device, wherein the standard wireless 802.11 protocol transceiver is disabled if the mobile device is sleeping, hibernating, or powered off; and
      a low power wireless 802.11 protocol transceiver configured to communicate a signal indicating a security status of the mobile device, powered by an independent power source comprising a battery or super-capacitor coupled to the low power wireless 802.11 protocol transceiver, wherein the low power wireless 802.11 protocol transceiver is configured to continue operating using the independent power source even if the mobile device is sleeping, hibernating, or powered off; and
   a base station comprising a remote wireless protocol 802.11 transceiver configured to periodically communicate a heartbeat signal with the low power wireless 802.11 protocol transceiver of the mobile device;
   wherein the low power wireless 802.11 protocol transceiver of the mobile device receives the heartbeat signal from the base station when the mobile device is within a predetermined range of the base station, wherein data on the data storage device is accessible and the mobile device is enabled for authorized access when within the predetermined range of the base station;
   wherein the low power wireless 802.11 protocol transceiver of the mobile device does not receive the heartbeat signal from the base station when the mobile device is outside the predetermined range of the base station, wherein an alarm is generated, data on the data storage device is rendered inaccessible, and the mobile device is disabled in order to prevent unauthorized access when outside the predetermined range of the base station.

2. The system of claim 1, wherein the base station comprises a WLAN access point or a mobile cellular telephone, wherein the location of the mobile device may be determined using a Received Signal Strength Indicator (RSSI) or WiFi positioning system (WPS) software; and
   wherein the mobile device to be secured comprises a laptop or notebook computer, a personal digital assistant (PDA), an external hard drive, or other electronic device that stores sensitive information or is of high value.

3. The system of claim 1, wherein the alarm generated comprises an audible beep or vibration providing an alert that the mobile device may be lost or stolen.

4. The system of claim 1, comprising computer readable code executed by the processor for disabling the mobile device when outside the predetermined range of the base station, wherein disabling the mobile device further comprises preventing the electronics from operating, suspending power to the components of the mobile device, or blocking the boot process until the mobile device is within the predetermined range of the base station, such that the mobile device is effectively locked in order to prevent asset theft.

5. The system of claim 1, wherein the low power wireless 802.11 protocol transceiver is coupled to an ExpressCard bus, a PCI Express (Peripheral Component Interconnect Express) bus, a mini-PCIe bus, a PCMCIA (Personal Computer Memory Card International Association) bus or a USB (Universal Serial Bus) bus.

6. The system of claim 1, wherein the low power wireless 802.11 protocol transceiver and data storage device are coupled to an encryption module configured to encrypt data on the data storage device when the mobile device is outside the predetermined range of the base station and decrypt the data when the mobile device is within the predetermined range, wherein the encryption module comprises an AES encryption unit.

7. The system of claim 1, wherein the low power wireless 802.11 protocol transceiver of the mobile device transmits an acknowledgement of the heartbeat signal to the base station.

8. The system of claim 1, wherein both the standard high power and low power wireless 802.11 protocol transceivers are enclosed internally within the mobile device.

9. A method for securing a mobile device, comprising:
   powering the mobile device, including a standard wireless 802.11 protocol transceiver configured to communicate user data over a wireless area network, with a main power source, wherein the standard wireless 802.11 protocol transceiver is disabled if the mobile device is sleeping, hibernating, or powered off;
   powering a low power wireless 802.11 protocol transceiver configured to communicate a signal indicating a security status of the mobile device, with an independent power source comprising a battery or super-capacitor coupled to the low power wireless 802.11 protocol transceiver, wherein the low power wireless 802.11 protocol transceiver continues to operate using the independent power source even if the mobile device is sleeping, hibernating, or powered off;
   wherein a base station comprising a remote wireless protocol 802.11 transceiver periodically communicates a heartbeat signal with the low power wireless 802.11 protocol transceiver of the mobile device;
   wherein the low power wireless 802.11 protocol transceiver of the mobile device receives the heartbeat signal from the base station when the mobile device is within a predetermined range of the base station, wherein data on the data storage device is accessible and the mobile device is enabled for authorized access when within the predetermined range of the base station; and wherein the low power wireless 802.11 protocol transceiver of the mobile device does not receive the heartbeat signal from the base station when the mobile device is outside a predetermined range of the base station, wherein an alarm is generated, data on a data storage device is rendered inaccessible, and the mobile device is disabled in order to prevent unauthorized access when outside the predetermined range of the base station.

10. The method of claim 9, wherein the low power wireless 802.11 protocol transceiver of the mobile device transmits an acknowledgement of the heartbeat signal to the base station.

11. The method of claim 9, wherein access to a network is granted if Media Access Control (MAC) addresses of both the high power and low power wireless 802.11 protocol transceivers of the mobile device match pre-authorized MAC addresses.

12. The method of claim 9, wherein data on the data storage device is rendered inaccessible if the low power wireless 802.11 protocol transceiver is removed from the mobile device.

13. The method of claim 9, wherein both the standard high power and low power wireless 802.11 protocol transceivers are enclosed internally within the mobile device.

14. The method of claim 9, wherein data on the data storage device is encrypted when the mobile device is outside the predetermined range of the base station and decrypted when within the predetermined range.

15. A motherboard, comprising:
a processor;
an encrypted disk drive coupled to the processor;
a standard wireless 802.11 protocol transceiver configured to access a data network, powered by a main power source of a mobile device, wherein the standard wireless 802.11 protocol transceiver is disabled if the mobile device is sleeping, hibernating, or powered off; and
a low power wireless 802.11 protocol transceiver configured to communicate a signal indicating a security status of the mobile device to a remote 802.11 protocol transceiver, powered by an independent power source comprising a battery or super-capacitor coupled to the low power wireless 802.11 protocol transceiver, wherein the low power wireless 802.11 protocol transceiver is configured to continue operating using the independent power source even if the mobile device is sleeping, hibernating, or powered off;
wherein the low power wireless 802.11 protocol transceiver receives a heartbeat signal periodically communicated from the remote wireless 802.11 protocol transceiver when the mobile device is within a predetermined range of the remote wireless 802.11 protocol transceiver, wherein data on the disk drive is accessible and the mobile device is enabled for authorized access when the security status signal indicates that the motherboard is secured;

wherein the low power wireless 802.11 protocol transceiver of the mobile device does not receive the heartbeat signal from the remote wireless 802.11 protocol transceiver when the mobile device is outside a predetermined range of the remote wireless 802.11 protocol transceiver, wherein an alarm is generated, data on the disk drive is rendered inaccessible, and the mobile device is disabled in order to prevent unauthorized access when the security status signal indicates that the motherboard is not secured.

16. The method of claim 9, further comprising rendering the mobile device inoperable by sending a lock command, wherein the mobile device is automatically locked if the mobile device fails to check in with the remote wireless 802.11 protocol transceiver at one or more scheduled times.

17. A system, comprising:
a mobile device to be secured, comprising:
a processor;
a standard wireless 802.11 protocol transceiver configured to access a data network, powered by a main power source of the mobile device, wherein the standard wireless 802.11 protocol transceiver is disabled if the mobile device is sleeping, hibernating, or powered off; and
a low power wireless 802.11 protocol transceiver configured to communicate a signal indicating a security status of the mobile device, powered by an independent power source coupled to the low power wireless 802.11 protocol transceiver, wherein the low power wireless 802.11 protocol transceiver is configured to continue operating using the independent power source even if the mobile device is sleeping, hibernating, or powered off; and
a wearable user key comprising a remote wireless protocol 802.11 transceiver configured to periodically communicate with the low power wireless 802.11 protocol transceiver of the mobile device, wherein the mobile device is enabled only when within a predetermined range of the user key.

18. The system of claim 17, further comprising a data storage device coupled to the processor, wherein data on the data storage device is accessible and the mobile device is enabled only when within the predetermined range of the user key.

19. The system of claim 17, further comprising computer readable code for sending a message containing authentication information from the user key to the mobile device, wherein communications between the mobile device and the user key are secured by encryption using public key cryptography.

20. The system of claim 17, further comprising computer readable code to set the predetermined range between the low power wireless 802.11 protocol transceiver of the mobile device and the remote wireless protocol 802.11 transceiver of the user key to define a virtual fence for the mobile device.

* * * * *